United States Patent
Pfeifle

(10) Patent No.: US 9,581,452 B2
(45) Date of Patent: Feb. 28, 2017

(54) NAVIGATION SYSTEM AND METHOD

(71) Applicant: HERE Global B.V., Veldhoven (NL)

(72) Inventor: Martin Pfeifle, Seewald (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/850,191

(22) Filed: Sep. 10, 2015

(65) Prior Publication Data

US 2015/0377632 A1   Dec. 31, 2015

Related U.S. Application Data

(63) Continuation of application No. 13/774,637, filed on Feb. 22, 2013, now Pat. No. 9,157,751.

(60) Provisional application No. 61/724,303, filed on Nov. 9, 2012.

(51) Int. Cl.
  *G01C 21/26* (2006.01)
  *G06F 17/30* (2006.01)
  *G01C 21/32* (2006.01)
  *G01C 21/34* (2006.01)

(52) U.S. Cl.
  CPC ............. *G01C 21/26* (2013.01); *G01C 21/32* (2013.01); *G01C 21/34* (2013.01); *G01C 21/3446* (2013.01); *G06F 17/30241* (2013.01)

(58) Field of Classification Search
  CPC .... G01C 21/32; G01C 21/34; G01C 21/3446; G01C 21/26; G06F 17/30241
  USPC .................................. 701/532, 533; 707/748
  See application file for complete search history.

(56) References Cited

U.S. PATENT DOCUMENTS

| | | | |
|---|---|---|---|
| 5,502,640 A | 3/1996 | Yagyu et al. | |
| 5,845,228 A | 12/1998 | Uekawa et al. | |
| 7,035,869 B2 * | 4/2006 | Smartt | ............. G06F 17/30241 |
| 7,957,894 B2 | 6/2011 | Wellmann | |
| 2005/0270299 A1 * | 12/2005 | Rasmussen | ............ G01C 21/32 |
| | | | 345/552 |
| 2007/0129885 A1 | 6/2007 | Wellmann | |
| 2008/0201070 A1 | 8/2008 | Kikuchi | |
| 2009/0248758 A1 | 10/2009 | Sawai et al. | |
| 2010/0235083 A1 | 9/2010 | Takahata et al. | |

* cited by examiner

*Primary Examiner* — Marthe Marc-Coleman
(74) *Attorney, Agent, or Firm* — Lempia Summerfield Katz LLC

(57) ABSTRACT

An apparatus and method are provided. A hierarchical navigation database with multiple levels including tiles is defined. Link data records representative of a road segments are stored in the hierarchical navigation database. A lower level tile containing a starting point data record of a route is identified. A link data record crossing the lower level tile border is identified. Whether the identified link data record also crosses a tile border of a higher level tile is determined. If the identified link data record crosses a tile border of a higher level tile, whether the higher level tile includes a destination point record is determined. Unless the higher level tile is determined to include the destination point record, a next link data record is determined in the route from the higher level.

18 Claims, 11 Drawing Sheets

NAVIGATION SYSTEM AND METHOD

RELATED APPLICATIONS

The present patent application is a continuation under 37 C.F.R. §1.53(b) and 35 U.S.C. §120 of U.S. patent application Ser. No. 13/774,637 filed Feb. 22, 2013, which claims the benefit of the filing date under 35 U.S.C. §119(e) of U.S. Provisional Patent Application Ser. No. 61/724,303, filed Nov. 9, 2012, both of which are hereby incorporated by reference herein in their entirety.

BACKGROUND

The following disclosure generally relates to navigation, and, more particularly, to compiling a navigation database for providing an optimal route.

Navigation systems may be provided on various different computer platforms. For example, a navigation system may be a standalone system or a networked system. In a standalone navigation system, the software applications, geographic data, and hardware are combined at a single location. The standalone system may be installed in a vehicle or carried by a person. In a networked navigation system, some of the software or geographic data is/are located with the hardware with the user and some of the software or geographic data is/are located remotely and accessed over a communications system. The navigation system may be implemented on a dedicated platform in which the hardware and software are specifically designed for navigation purposes. Alternatively, the navigation system may be implemented on a general purpose computing platform (e.g., a personal computer, personal digital assistant, smart phone, or a networked computer) using appropriate navigation-related software applications and data.

Navigation systems provide a variety of useful features and services. For example, navigation systems used in vehicles can provide detailed instructions for driving to desired destinations, thereby reducing travel times and expenses. Navigation systems and navigation applications can also search for businesses of a desired type and provide routing guidance to locations of such businesses.

Finding an acceptable route from a starting point S to a destination point D is the core functionality of a navigation system. Most navigation systems do not attempt to determine an "optimum" route from S to D, as such a determination, which would require analyzing all of the links in the navigation system, would be both memory and time-intensive. For example, computing the "optimum" route from a starting point S in Madrid to a destination point D in Moscow may take upwards of an hour on an embedded navigation system.

Instead, most navigation systems aim to determine and provide an acceptable route, in a timely manner, for a given cost function (e.g., "the shortest route," "the fastest route," etc.). These navigation systems may, for example, utilize a navigation database created according to the Navigation Data Standard ("NDS"). NDS databases include a 5-layer or level hierarchical graph structure. Each layer or level of the graph structure may be divided into tiles, or equally-sized areas, and includes only those links or road segments that belong to a specific functional road class ("FRC"). Each link may, for example, be assigned a FRC value between 1 and 5, with the assigned value reflecting the importance of the link for route calculations (e.g., a FRC value of 1 indicates that the link is the most important for route calculation purposes). The links are then placed into one of the layers or levels based on the assigned FRC value. When these navigation systems are attempting to find an acceptable route between a starting point and a destination point, these navigation systems may "explore" all links on a routing level (e.g., the lowest routing level) around the starting point and the destination point. The system may then apply heuristics to determine when to switch from the lowest routing level to another level (e.g., the second lowest routing level). Using this approach, the navigation system may calculate, in a timely manner, the appropriate, but not necessarily optimal, route from the starting point and the destination point.

SUMMARY

To address these and other objectives, the present embodiments relate to providing or compiling a navigation database to be used for quickly and/or easily determining and providing an optimal route.

In one embodiment, a method is provided that includes defining first and second levels of a navigation database, the first level being divided into a plurality of first tiles, and the second level being divided into a plurality of second tiles larger than the first tiles. A plurality of link data records is stored in the first level of the navigation database, the plurality of link data records being representative of a plurality of road segments in a geographic region. A processor determines one or more link data records of the plurality of link data records to be stored in the second level. The determining is based on a position of each of the plurality of link data records relative to the plurality of second tiles. The one or more link data records are stored in the second level based on the determining.

BRIEF DESCRIPTION OF THE DRAWINGS

Exemplary embodiments of the present invention are described herein with reference to the following drawings.

DETAILED DESCRIPTION OF THE PRESENTLY PREFERRED EMBODIMENTS

The present embodiments generally relate to compiling a navigation database for use in a navigation system and providing an optimal route based on the compiled navigation database. Known navigation systems include a multi-layer navigational database compiled based solely on the FRC value assigned to each link data record (i.e., the layers of the navigational database only include those links that belong to a specific FRC). Unlike known navigation systems, the present embodiments compile one or more layers of a navigation based on a position of each link data record relative to higher-level tiles. As such, links, even minor links (e.g., those assigned an FRC value of 5) may be propagated to higher routing levels simply based on their position relative to higher level tiles (e.g., the borders of higher level tiles). Unlike other known navigation systems, in which links may be artificially clipped at tile borders in a layer, in the present embodiments, the links are connected to one another throughout the layer, particularly across or over tile borders in the layer. By compiling a navigation database in this way, the present embodiments provide "thinned-out" graphs that may nonetheless be used to provide an optimal route.

Known navigation systems may "explore" all links on one or more routing levels and may utilize heuristics to determine when to move between routing levels in an effort to find an acceptable route between a starting point and a destination point. Unlike known navigation systems, the present embodiments provide a navigation system that explores a minimal number of links and moves between routing levels at or based on tile borders, which reduces the runtime of the navigation system, such that an optimal, rather than acceptable, route may be calculated and provided in a timely manner.

Figure 1:
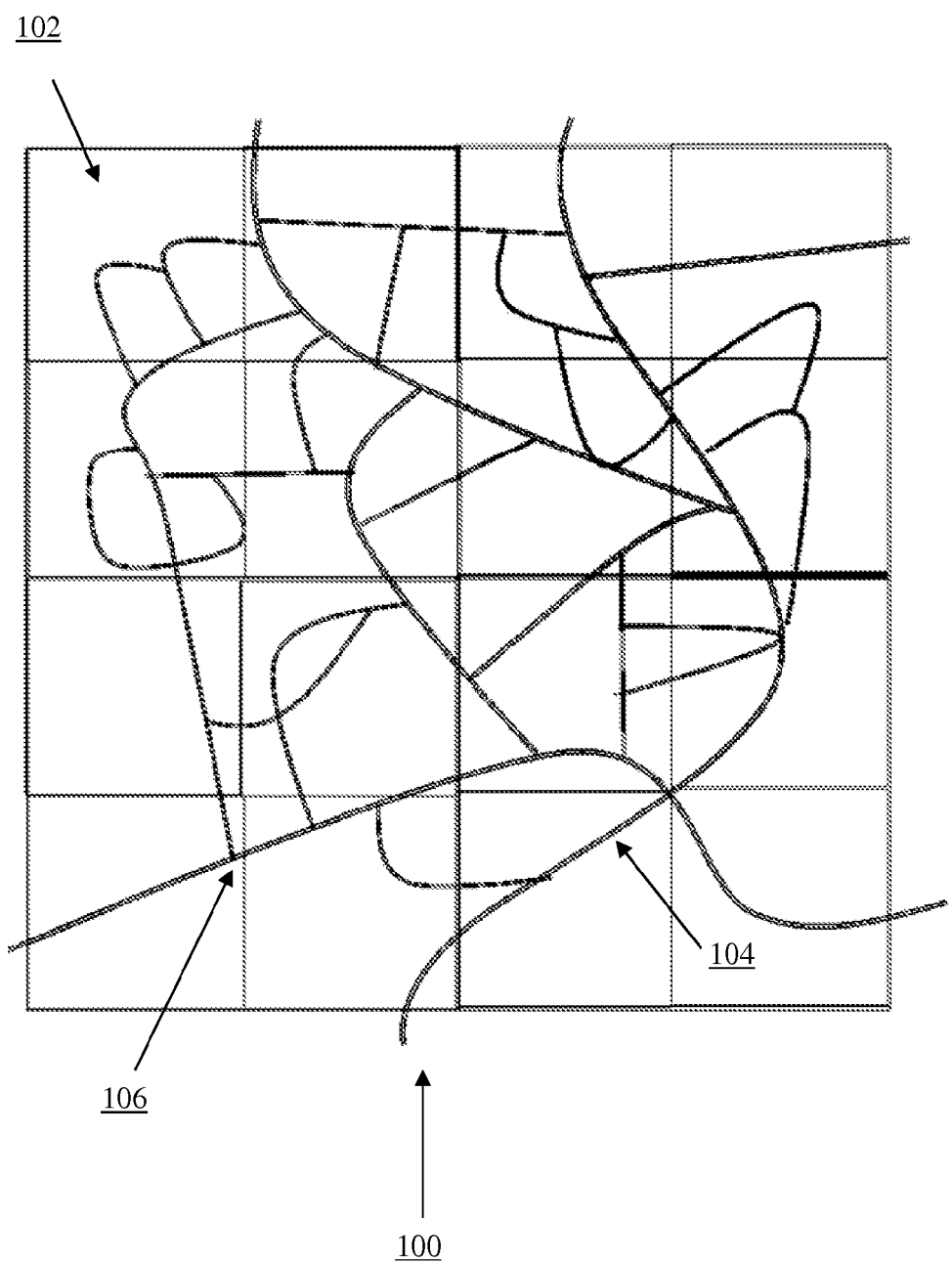
FIG. 1 depicts an exemplary geographic region.

FIG. 1 is diagram illustrating a geographic region 100. The region 100 may be a country (e.g., France), state (e.g., Illinois), province, city (e.g., Chicago), metropolitan area (e.g., the New York metropolitan area), county (e.g., Cook County, Illinois), any other municipal entity, or any other area of comparable or different size. Alternatively, the geographic region 100 may be a combination of one or more countries, states, cities, metropolitan areas, and so on. The region 100 may represent locations without reference to geo-political boundaries, such as being a rectangular regions centered on or relative to a particular point or location.

The region 100 includes a road network 102. The road network 102 may include, among other things, a plurality of road segments 104 connected at intersections 106 throughout the region 100. Though not depicted herein, the region 100 may also or alternatively include one or more points of interest, such as businesses, municipal entities, tourist attractions, and/or other points of interest, one or more topographical features (e.g., ponds, lakes, mountains, hills, etc.), a pedestrian network having sidewalks and pedestrian paths, a bicycle network having bike paths, bike lanes on road segments, and/or road segments appropriate for bicycle travel, a public transit network including, for example, railroads, public bus lines, tourist bus lines, metro railway lines (e.g., subways and elevated lines), light rail (e.g., trams, trolleys, or street cars), water taxi, and stations and/or stops for one or more of each, or combinations thereof. The region 100 may include other networks, features, and/or points as well. The road network 102, particularly one or more of the road segments 104 and/or the intersections 106, may, in other embodiments, vary from what is depicted in FIG. 1.

Figure 2:
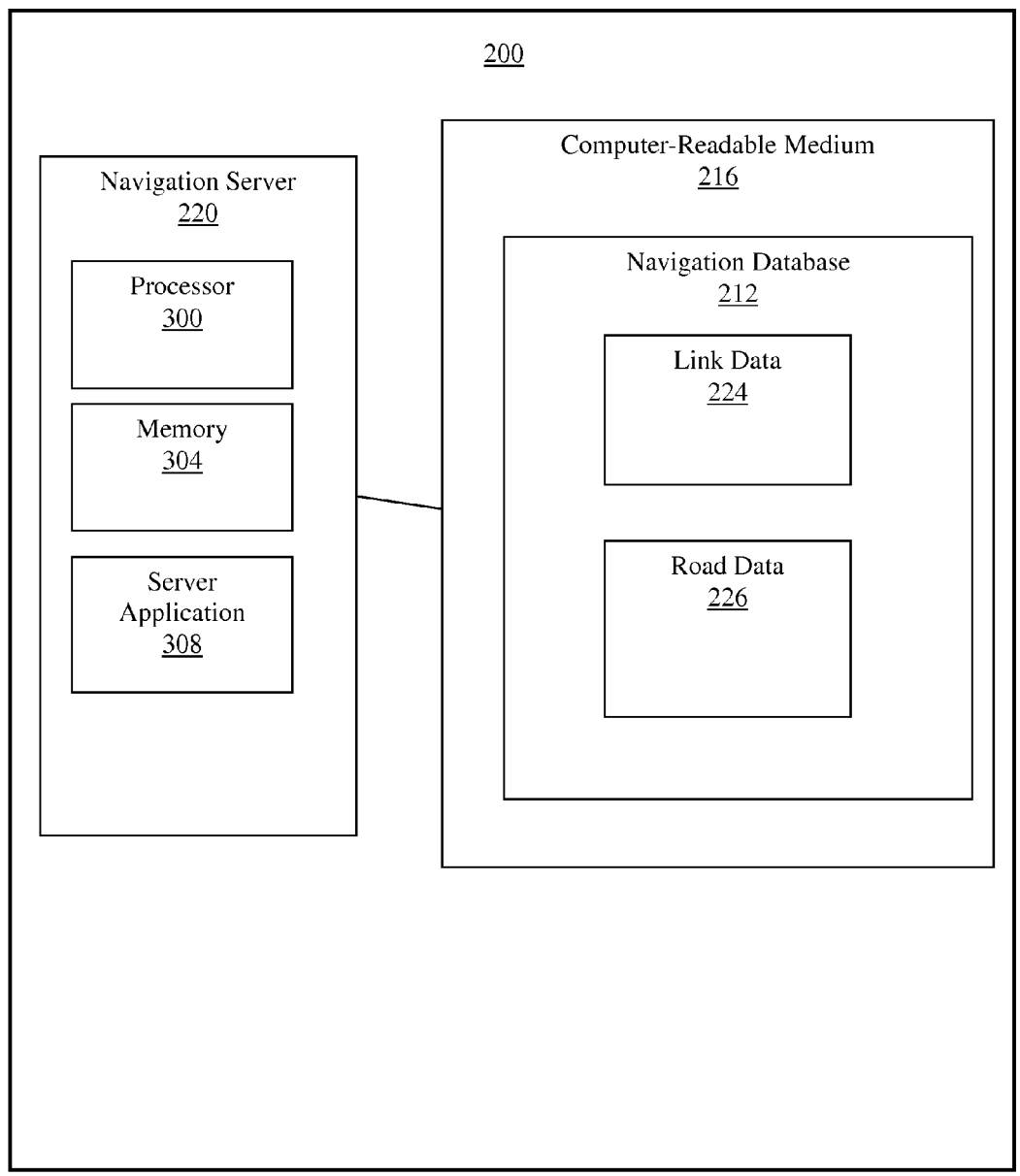
FIG. 2 depicts a block diagram of an exemplary navigation system for compiling a navigation database and providing an optimal route.

FIG. 2 shows a block diagram of one embodiment of a navigation system 200 for calculating or determining an optimum route between a starting point S and a destination point D. The navigation system 200 is created, compiled, or provided by a navigation system provider (e.g., NAVTEQ or Nokia Corp.) and may be used by or in connection with a mobile device, such as a mobile phone, a personal digital assistant, a tablet computer, a notebook computer, a personal navigation device, a portable navigation device, and/or any other portable or mobile device. In some embodiments, the navigation system 200, and components thereof, may be partially or fully located within or be part of the mobile device. For example, the mobile device may contain the navigation system 200. In other embodiments, the navigation system 200 (or individual components thereof, as described below) may be implemented as computer program logic or computer readable program code stored in the memory and/or storage of a computer, such as the computer 500 described below with respect to FIG. 11, and executable by one or more processors thereof to implement the disclosed functionality.

The navigation system 200 generally includes a navigation database 212 stored on a computer readable medium 216. The navigation database 212 in these embodiments is an NDS database (i.e., the database is created, compiled, or provided in accordance with the Navigation Database Standard). In other embodiments, the navigation database 212 may be a different type of database. The computer readable medium 216 may include one or more hard drives or other storage medium. The system 200 further includes a navigation server 220 that may access the computer readable medium 216. In other embodiments, the server 220 may be part of or separate (e.g., remote) from the database 212.

The navigation database 212 stores or maintains geographic data such as, for example, road segment or link data records 224 and node data records 226. The link data records 224 are links or segments representing the roads, streets, or paths 104. The node data records 226 are end points (e.g., the intersections 106) corresponding to the respective links or segments of the road segment data records 224. The road link data records 224 and the node data records 226 may represent, for example, the road network 102 or other road networks used by vehicles, cars, and/or other entities. The road link data records 224 may be associated with attributes of or about the roads 104, such as geographic coordinates, street names, address ranges, speed limits, turn restrictions at intersections, and/or other navigation related attributes (e.g., one or more of the road segments 104 is part of a highway or tollway, the location of stop signs and/or stoplights along the road segments 104, etc.), as well as points of interest (POIs), such as gasoline stations, hotels, restaurants, museums, stadiums, offices, automobile dealerships, auto repair shops, buildings, stores, parks, etc. The node data records 226 may likewise be associated with attributes (e.g., about the intersections 106), such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic data may additionally or alternatively include other data records, such as, for example, POI data records, topographical data records, cartographic data records, routing data, and maneuver data.

The data records 224 are each assigned or associated with an importance value that reflects the importance of the link or segment for route calculation (e.g., a high importance value indicates that the link may be very important for route calculation purposes). In these embodiments, each of the data records 224 is assigned or associated with a functional road class (FRC) value between 1 and 5. For example, a FRC value of 1 may indicate that the link or segment is very important (e.g., it is of national or international importance) and a FRC value of 5 may indicate that the link or segment is not very important (e.g., it is of only local importance). Conversely, a FRC value of 5 may indicate that the link or segment is very important. In other embodiments, additional, different, or fewer values may be assigned or associated with the data records 224. For example, the data records 224 may be assigned or associated with different values other than FRC values.

Figure 3:
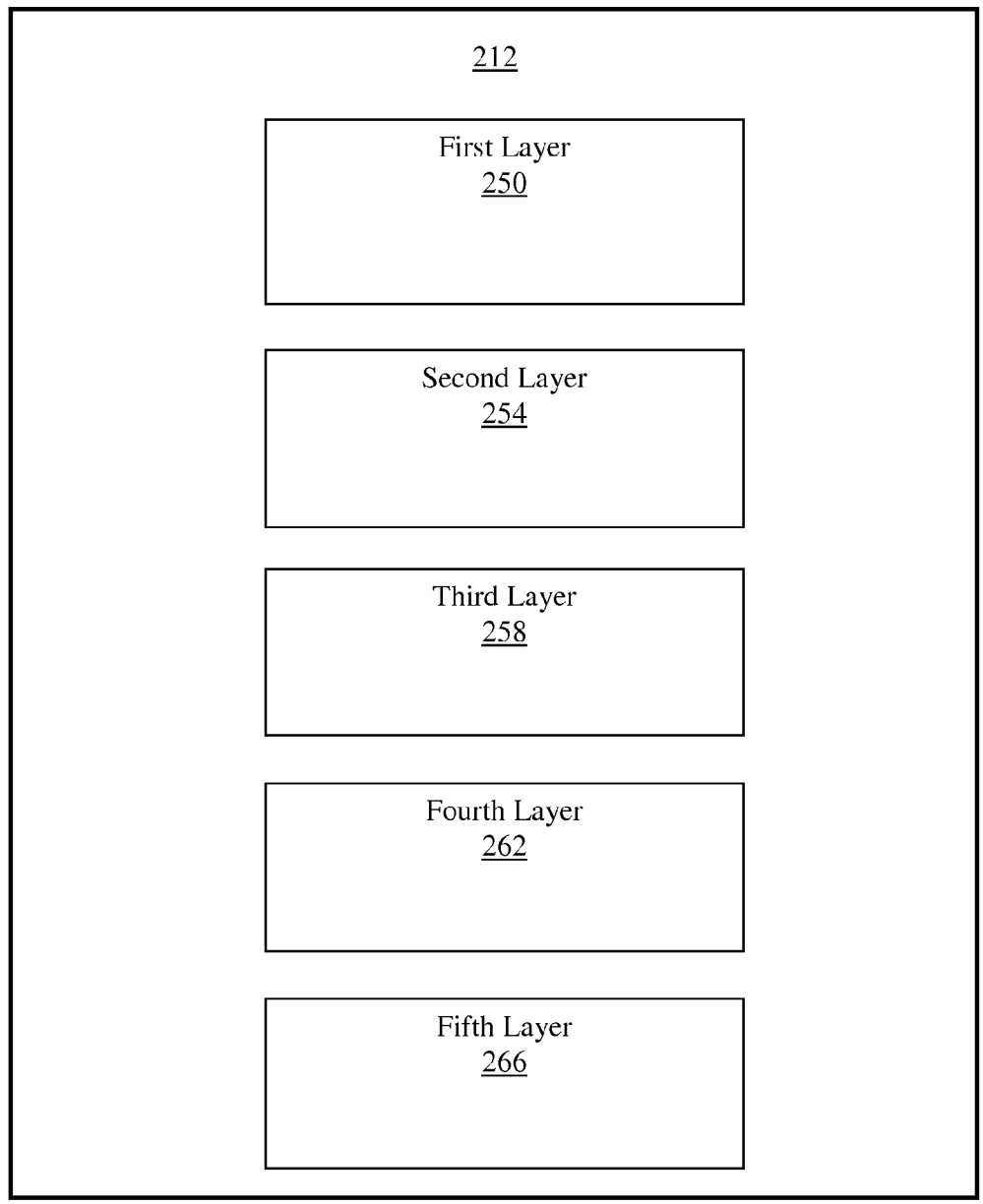
FIG. 3 depicts a block diagram of an exemplary navigation database of the navigation system of FIG. 2.

The navigation database 212 is divided or organized into, or defined to include, one or more layers or levels stored on the computer readable medium 216. The one or more layers generally include one or more of the link data records 224 and node data records 226, but may, alternatively or in addition to, include one or more other data records. As shown in the example of FIG. 3, the navigation database 212 in this embodiment, which may be an NDS database, is divided or organized into, or defined to include, five different routing layers or levels—a first routing layer 250, a second routing layer 254, a third routing layer 258, a fourth routing layer 262, and a fifth routing layer 266. In other embodiments, the database 212 may be divided or organized into more or less different routing layers or levels. For example, the database 212 may be organized into 2, 3, 7, or any other number of different routing layers or levels.

Each of the layers 250, 254, 258, 262, 266 includes one or more link data records 224 (i.e., one or more link data records 224 are stored in each of the layers 250, 254, 258, 262, 266) as will be described below. The first routing layer 250 (which corresponds to, for example, Layer 4 of the NDS database) is defined as the highest routing level or layer and includes a plurality of first tiles. The second routing layer 254 (which corresponds to, for example, Layer 6 of the NDS database) is defined as the second highest routing level or layer and includes a plurality of second tiles. The second routing layer 254 includes more tiles than the first routing layer 250, but the second tiles in the second routing layer each represent a smaller area than the area represented by each of the tiles in the first routing layer (i.e., the dimensions of or area represented by each second tile is/are smaller than the dimensions of or area represented by each first tile). The third routing layer 258 (which corresponds to, for example, Layer 8 of the NDS database) is defined as the third highest routing level or layer, or the third lowest routing level or layer, and includes a plurality of third tiles. The third routing layer 258 includes more tiles than the first routing layer 250 and the second routing layer 254, but the third tiles in the third routing layer each represent a smaller area than the area represented by each of the first tiles and each of the second tiles (i.e., the dimensions of or area represented by each third tile is/are smaller than the dimensions of or area represented by each first tile and each second tile). The fourth routing layer 262 (which corresponds to, for example, Layer 10 of the NDS database) is defined as the second lowest routing level or layer and includes a plurality of fourth tiles. The fourth routing layer 262 includes more tiles than the first, second, and third routing layers 250, 254, 258, but the fourth tiles in the fourth routing layer each represent a smaller area than the area represented by each of the first, second, and third tiles (i.e., the dimensions of or area represented by each fourth tile is/are smaller than the dimensions of or area represented by each first tile, second tile, and third tile). The fifth routing layer 266 (which corresponds to, for example, Layer 13 of the NDS database) is defined as the lowest routing level or layer and includes a plurality of fifth tiles. The fifth routing layer 266 includes more tiles than any of the other four layers 250, 254, 258, 262, but the fifth tiles in the fifth routing layer each represent a smaller area than the area represented by each of the tiles in any of the other four layers (i.e., the dimensions of or area represented by each fifth tile is/are smaller than the dimensions of or area represented by each first tile, each second tile, each third tile, and each fourth tile). In other embodiments, the routing layers 250, 254, 258, 262, 266 may include additional, fewer, or different tiles. For example, the tiles in the routing layer 258 may each represent a larger area than the area represented by each of the first and second tiles.

The exact dimensions of each first, second, third, fourth, and fifth tile may vary. In one embodiment, each second tile represents an area 1/16 the size of each first tile, each third tile represents an area 1/16 the size of each second tile, each fourth tile represents an area 1/16 the size of each third tile, and each fifth tile represents an area 1/64 the size of each fourth tile (i.e., each first tile includes 16 second tiles, each second tile includes 16 third tiles, each third tile includes 16 second tiles, and so on). In other embodiments, the database 212 may include different sized or dimensioned routing tiles.

With reference again to FIG. 2, the navigation server 220 includes a processor 300, a memory 304, and a server application 308. In other embodiments, the navigation server 220 may include additional, different, or fewer components. For example, the server 220 may include additional processors 300 and/or memories 304. As another example, the server 220 may include additional server applications 308 operative to perform different functions (e.g., one server application 308 operative to compile one or more layers of the database 212 and a second server 308 operative to provide navigational or route guidance).

The processor 300 may be a general processor, a digital signal processor, ASIC, field programmable gate array, graphics processing unit, analog circuit, digital circuit, combinations thereof, or other now known or later developed processor. The memory 304 may be a volatile memory or a non-volatile memory. The memory 304 may include one or more of a read only memory (ROM), random access memory (RAM), a flash memory, an electronic erasable program read only memory (EEPROM), or other type of memory. The memory 304 may include an optical, magnetic (hard drive) or any other form of data storage device. The server application 308 may be stored on the memory 304 of the server 220 to be executed by the processor 300. The server application 308 may be written in a suitable computer programming language, such as a C, although other programming languages (e.g., C++ or Java) may be used.

The database 212 and the layers therein are generally compiled or structured such that the navigation system 200, particularly the navigation server 220, may quickly and easily calculate or determine an optimum or optimal route between the starting point S and the destination point D. To this end, the server application 308 compiles one or more of the layers of the database 212 based on one or more pre-compiled lower layers.

In some embodiments, the server application 308 is operative to pre-compile or pre-store the link data records 224 in one or more of the lower layers 254, 258, 262, 266 of the database 212. In other words, the server application 308 is operative to pre-compile, or compile before one or more of the other layers of the database 212, one or more of the lower layers of the database (e.g., the layers 254, 258, 262, 266). In these embodiments, the server application 308 pre-compiles the link data records 224 in one or more of the lower layers based on the FRC value assigned to each link data record 224. In other embodiments, the server application 308 may pre-compile the link data records 224 based on a different value (e.g., different importance value) or according to some other criteria. In other embodiments, the link data records 224 may be pre-compiled by the system operator and/or the end user in conjunction with or without the server application 308.

In some embodiments, each of the layers 254, 258, 262, 266 is pre-compiled. In such a case, the layer 266 may include all of the link data records 224 (i.e., link data records assigned or associated with any FRC value), the layer 262 may include a portion of the link data records 224 stored in the layer 266, the layer 258 may include a portion of the link data records 224 stored in the layer 262, and the layer 254 may include a portion of the link data records 224 stored in the layer 258. For example, the layer 266 may include link data records 224 assigned any FRC value, the layer 262 may include link data records 224 assigned a FRC value of 1, 2, 3, or 4, the layer 258 may include link data records 224 assigned a FRC value of 1, 2, or 3, and the layer 254 may include link data records 224 assigned a FRC value of 1 or 2. In another embodiment, only the layers 262, 266 are pre-compiled. For example, the layer 266 may include all of the link data records 224, and the layer 262 may include a portion of the link data records 224 stored in the layer 266. In yet another embodiment, only the layer 266 is pre-compiled. In other embodiments, any combination of the layers 254, 258, 262, 266 may be pre-compiled. In one embodiment, an existing NDS database, particularly one or more layers thereof, may be used as or to provide the pre-compiled layers.

In any of the present embodiments, one or more link data records 224 may cross or intersect one or more tile borders of the tiles of the respective layer, such that the one or more link data records 224 may span, stretch across, or traverse two or more tiles of the respective layer. For example, when the layer 266 is pre-compiled and includes all of the link data records 224, one or more of the link data records 224 may cross or intersect one or more tile borders of the plurality of fifth tiles of the layer 266. In other words, the link data records 224 need not be cut or segmented at tile borders. In the embodiments in which the database 212 is an NDS database, the database 212, and the compilation thereof, is thus consistent with the NDS standard.

Once the link data records 224 are pre-compiled or stored in one or more of the lower layers of the database (e.g., the layers 254, 258, 262, 266), the server application 308 is operative to compile the remaining layers of the database 212. The server application 308 determines, computes, or calculates one or more of the link data records 224 to be stored or compiled in the next-higher layer(s) of the database (e.g., the layers 250, 254, 258, 262) based on one or more of the link data records 224 stored in the one or more lower layers of the database (e.g., the layers 254, 258, 262, 266, respectively). In other words, the link data records of a higher-level tile (and, in turn, layer) are computed or determined using only the link data records of a child or lower-level tile (and, in turn, layer). For example, if the link data records 224 are pre-compiled or stored in the layer 266, the server application 308 may determine one or more link data records 224 to be stored in the layer 262 (the next-highest layer) based on the one or more link data records 224 stored in the layer 266. Likewise, if the link data records 224 are pre-compiled or stored in the layer 262, the server application 308 may determine one or more link data records 224 to be stored in the layer 258 (the next-highest layer) based on the one or more link data records 224 stored in the layer 262.

In some embodiments, only the highest layer (e.g., the layer 250) is determined in this manner. In other embodiments, however, more than one of the layers (e.g., the layers 250, 254, 258, 262) may be successively determined in this manner. For example, two of the layers (e.g., the layers 250, 254), three of the layers (e.g., the layers 250, 254, 258), or four of the layers (e.g., the layers 250, 254, 258, 262) may be successively determined in this manner. For example, if the link data records 224 are pre-compiled in the layer 262, the one or more link data records 224 to be stored in the layer 258 (the next-highest layer) may be determined based on the link data records 224 stored in the layer 258. In turn, the one or more link data records 224 to be stored in the layer 254 (the next-highest layer) may be determined based on the one or more link data records 224 stored in the layer 258. As such, the present embodiments may generally be used to compute any number of higher-level routing layers or levels from child or lower-level routing layers or levels. The determination, computation, or calculation may be performed by the system operator and/or the navigation server 220 (e.g., the processor 300).

The determination of one or more link data records 224 to be stored or compiled in the layer 250, 254, 258, or 262 may be generally based on a position or location of the link data records 224 stored in the next-lowest respective layer (e.g., the layer 254, 258, 262, or 266). For example, the determination of one or more link data records 224 to be stored in the layer 250 may be based on a position of the link data records 224 stored in the layer 254 (which is the next-lowest layer). As another example, the determination of one or more link data records 224 to be stored in the layer 254 may be based on a position of the link data records 224 stored in the layer 258 (which is the next-lowest layer).

More specifically, the determination may be based on a position of the link data records 224 stored in the next-lowest respective layer (e.g., the layer 254, 258, 262, or 266) relative or with respect to the tiles, particularly the tile borders, of the layer to which the one or more link data records are to be stored (e.g., the layer 250, 254, 258, or 262, respectively). The one or more link data records 224 to be stored or compiled in the layer 250, 254, 258, or 262 may be determined based on whether the link data records 224 stored in the next-lowest layer (e.g., the layer 254, 258, 262, or 266, respectively) cross or intersect one or more tile borders of the tiles in the layer to which the one or more link data records are to be stored (i.e., the parent layer).

In the present embodiments, the server application 308 determines a starting link set and a destination link set. The starting link set includes at least one link data record of the link data records 224 stored in the layer (e.g., the layer 254, 258, 262, or 266) that cross a tile border of the tiles in the next-highest respective layer (e.g., the layer 250, 254, 258, or 262) and have a travel direction that extends or travels into the tile border (i.e., the travel direction is inside the respective tile). The starting link set may include any number of link data records, depending on the number of link data records of the link data records 224 stored in the layer that cross the tile border of the tiles in the next-highest respective layer and have a travel direction that extends into the tile border. The destination link set includes at least one link data record of the link data records 224 stored in the layer (e.g., the layer 254, 258, 262, or 266) that cross a tile border of the tiles in the next-highest respective layer (the same layer used to determine the starting link set) and have a travel direction that extends or travels out or outward of the tile border (i.e., the travel direction is outside of the respective tile). The destination link set may include any number of link data records, depending on the number of link data records of the link data records 224 stored in the layer that cross the tile border of the tiles in the next-highest respective layer and have a travel direction that extends out of the tile border. The starting link set and the destination link set may include the same or a different number of link data records. In other embodiments, the starting link set and/or the destination link set may vary and/or be determined in a different manner (e.g., not using the server application 308).

In some embodiments, the database 212 for the geographic region 100 may be decoupled from the database 212 for a different geographic region, in which case one or more of the layers 254, 258, 262, 266 may include one or more connection points (e.g., Gateways) to the other database. In the event that one or more of the layers 254, 258, 262, 266 includes one or more of these connection points, any link data records connected to one of the connection points may be treated as a boundary link (i.e., as though it crosses the tile border of the tiles in the next-highest respective layer (e.g., the layer 250, 258, 262, or 266)).

Once the starting and destination link sets are compiled or determined, the intermediate link data records (i.e., the link data records between the starting and destination link data records) to be included in the layer are determined. The server application 308 determines or calculates one or more optimal routes between the at least one data records in the starting link data set and the at least one data records in the destination link set. In some embodiments, the server application 308 determines or calculates one optimal route between each of the at least one link data records in the starting link data set and each of the at least one data records based on a given cost function and any number of different constraints. In other embodiments, the server application 308 determines two or more optimal routes between each of the at least one link data records in the starting link data set and each of the at least one link data records in the destination link set, with the two or more optimal routes determined using two or more different cost functions, respectively. In the embodiments in which two or more optimal routes are determined, the link data records in the starting and destination link data sets will be identical, but link data records there between will vary depending on the respective cost function. Many of the link data records there between will be included or part of each of the two or more optimal routes, but the two or more optimal routes may include one, some, or all of the same link data records.

The one or more optimal routes may be calculated using or via any type of route calculation algorithm, such as, for example, a Dijkstra algorithm, an A-star algorithm, a Douglas-Peucker algorithm, or any other type of algorithm (e.g., a bi-directional variant). In some embodiments, one algorithm may be used or carried out to determine each optimal route. In other embodiments, one algorithm may be used or carried out to determine all of the optimal routes that originate from the same link data record in the starting link data set, such that the number of algorithms used depends on the number of link data records in the starting link data set. For example, if the starting link data set includes two link data records and the destination link data set includes two link data records, one algorithm may be used to determine the optimal routes from a first link data record in the starting link data set (to the link data records in the destination link data set) and another algorithm may be used to determine the optimal routes from a second link data record in the starting link data set (to the link data records in the destination link data set). In other words, a first algorithm is used to calculate two different optimal routes, and a second algorithm is used to calculate two additional different optimal routes. By reducing the number of computations that need to be performed, the server application 308 may have an improved runtime.

The route calculation algorithm may calculate the one or more optimal routes using any number of different cost functions. For example, the cost function may be "shortest route," "most economical route," or "fastest route." Other cost functions may be used. Moreover, any number of different constraints may be specified within any of these cost functions. For example, the constraint may be "avoid highways," "avoid tunnels," or "optimal eco-routes." Any other constraint may be specified.

The determined optimal route(s) include(s) one or more link data records stored in the next-lowest layer of the database 212. The one or more link data records that are stored in the layer (e.g., the layer 254, 258, 262, or 266) of the database 212 and form, comprise, or are part of the optimal route(s) are the one or more link data records to be stored in or propagated to the next-highest respective layer 250, 254, 258, or 262. For example, the one or more link data records that are stored in the layer 266 and are part of an optimal route are the one or more link data records to be stored in the layer 262 (the next-highest layer). Conversely, the one or more link data records that are stored in the layer (e.g., the layer 254, 258, 262, or 266) of the database 212 and do not form, comprise, or are not part of the optimal route(s) are not to be stored in or propagated to the next-highest respective layer 250, 254, 258, or 262.

Figure 4:
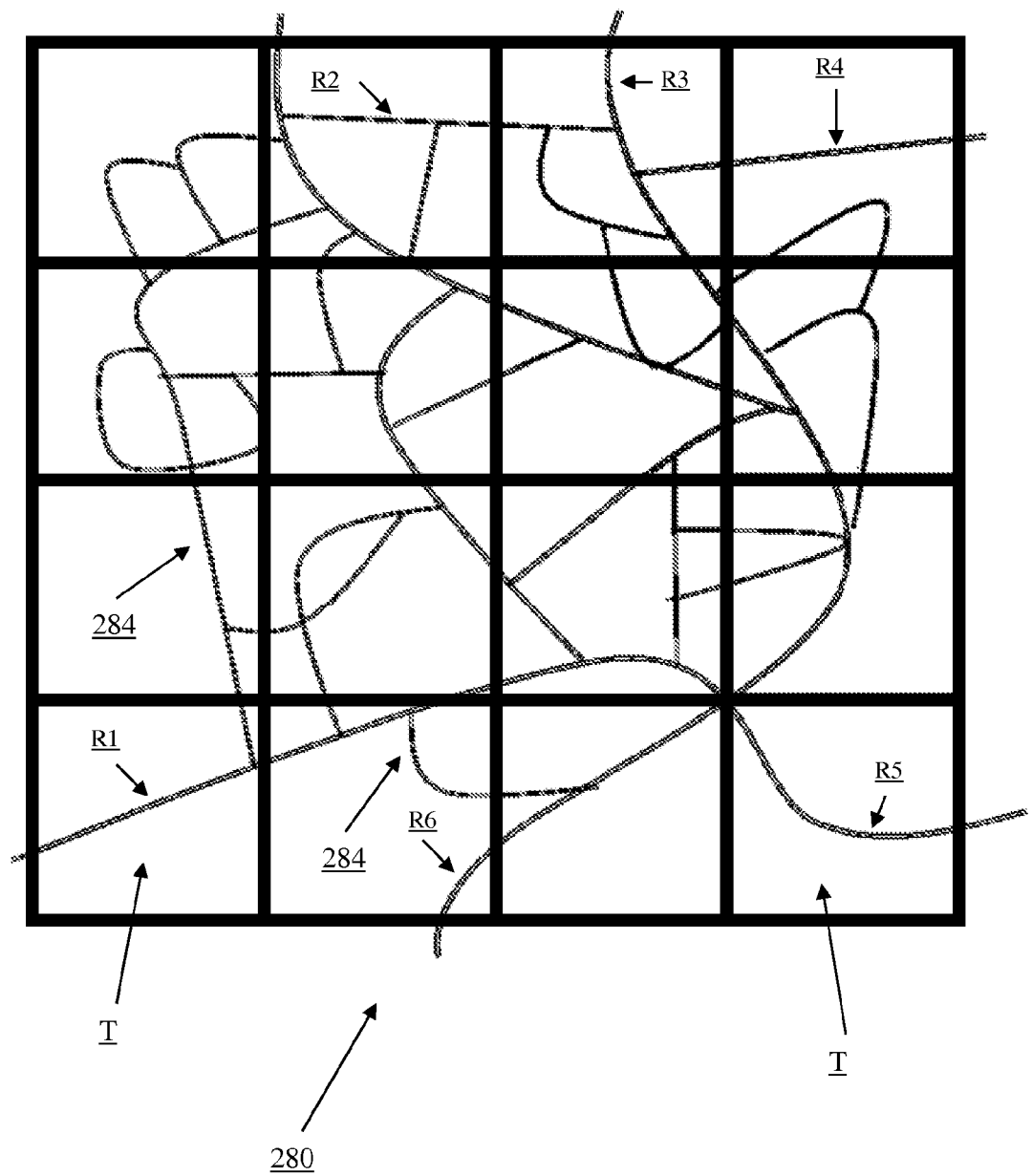
FIG. 4 depicts a first exemplary layer of the navigation database of FIG. 3 with a plurality of link data records stored therein.
Figure 5:
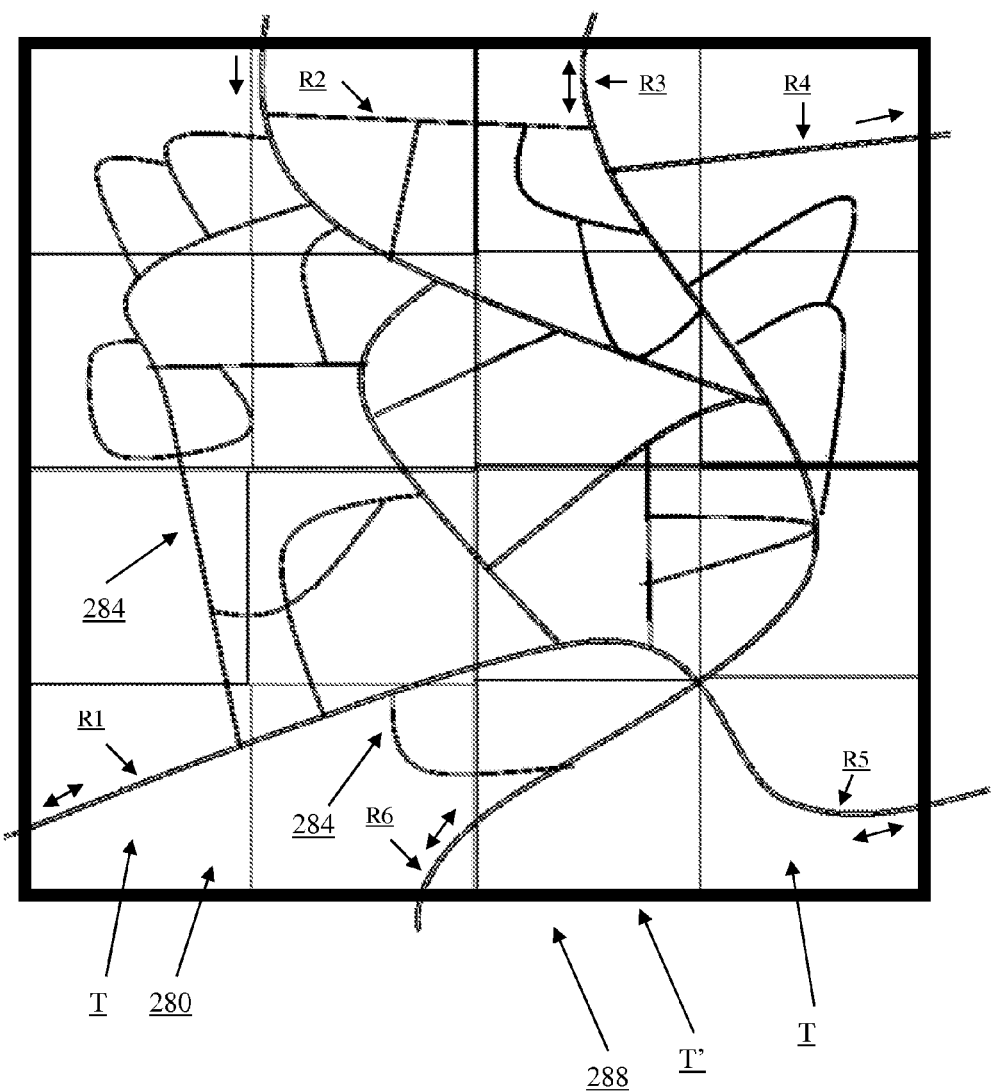
FIG. 5 depicts the first layer of FIG. 4 and a second exemplary layer.
Figure 6:
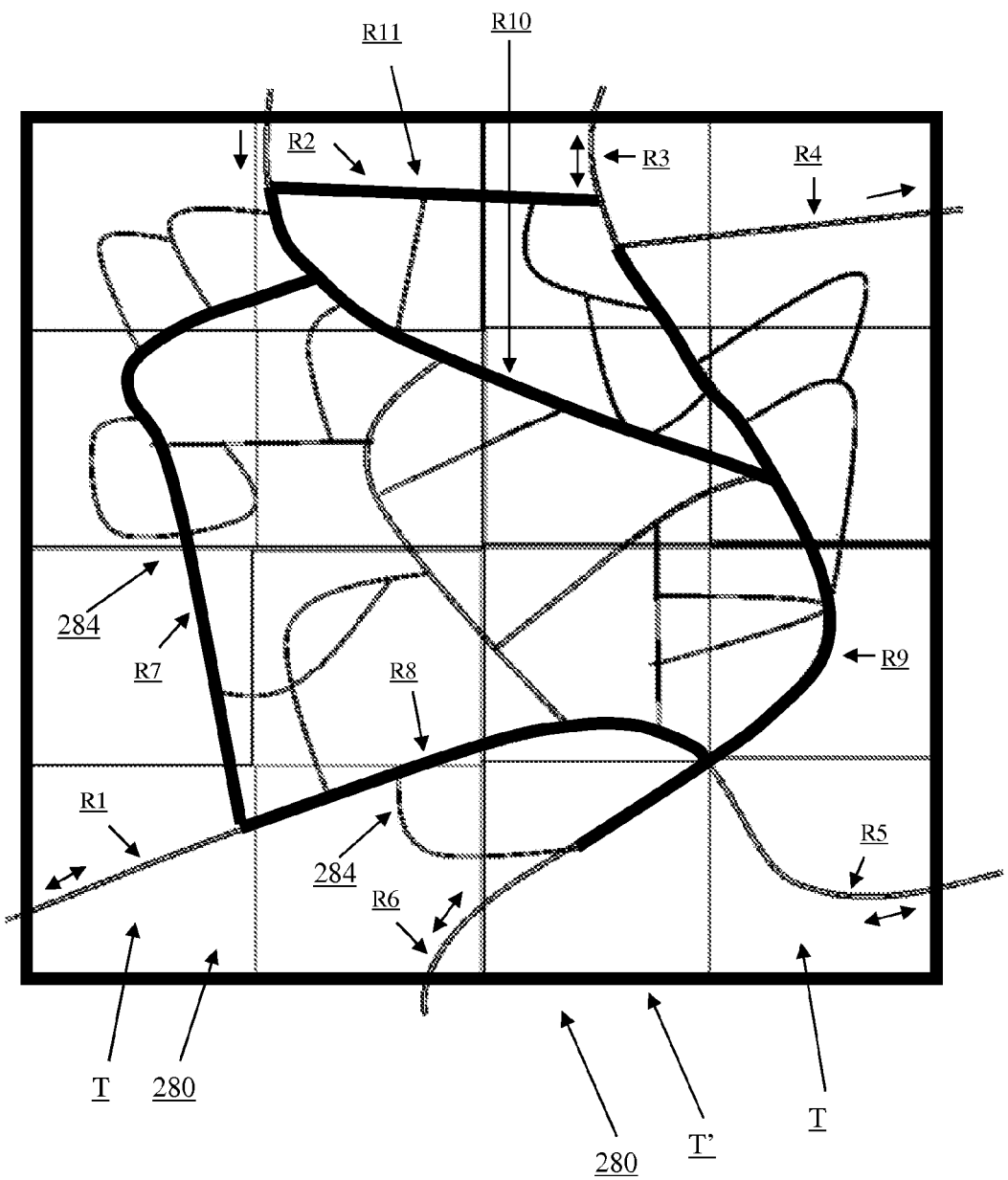
FIG. 6 depicts the first and second layers of FIG. 5 and compiling the second layer from the link data records stored in the first layer.

FIGS. 4-6 depict an example of how the server application 308 may determine one or more link data records to be stored in a layer (e.g., the layer 250, 254, 258, or 262) based on the link data records 224 stored in a next-lowest respective layer (e.g., the layer 254, 258, 262, or 266, respectively). FIG. 4 illustrates a portion of an exemplary layer 262. The exemplary layer 262 is divided into a plurality of equally-sized and square-shaped tiles T. The portion of the layer 262 illustrated in FIG. 4 has sixteen equally-sized tiles T, each tile T outlined by a thick black line. The portion of the layer 262 depicted in FIG. 4 includes a plurality of link data records 224, particularly link data records 224 for or that represent road segments R1, R2, R3, R4, R5, and R6.

FIG. 5 illustrates the portion of the exemplary layer 262 depicted in FIG. 4, the travel direction(s) of each road segment R1, R2, R3, R4, R5, and R6 (indicated by the single or double sided arrow immediately adjacent the road segment), and a portion of an exemplary layer 258. The exemplary layer 258 is divided into a plurality of equally-sized and square-shaped tiles T'. Each tile T' is sixteen times larger than each tile T (i.e., each tile T' includes sixteen tiles T). The portion of the layer 258 illustrated in FIG. 5 has one tile T', which is square and outlined by a thick black line. Prior to the determination, no link data records are stored in the layer 258.

As described above, to determine the one or more link data records to be stored in the layer 258 using or based on the link data records 224 stored in the layer 262, the server application 308 determines or creates a starting link set and a destination link set for the tile T' in the layer 258. The starting link set in this example includes all link data records stored in the layer 262 that cross a tile border of the tile T' of the layer 258 and have a travel direction inside or that extends into the tile T'. Travel in both directions satisfies the requirement for an inside travel direction. Thus, the starting link set in this example includes the link data records 224 for road segments R1 (travels in both directions), R2 (travels into or inside the tile T'), R3 (travels in both directions), R5 (travels in both directions), and R6 (travels in both directions). Even though R4 extends to the border of tile T', R4 is not included in the starting link set because it has a travel direction that extends out from the tile T'.

The destination link set in this example includes all link data records stored in the layer 262 that cross a tile border of the tile T' of the layer 258 and have a travel direction outside or that extends out from the tile T' or travel in both directions. Thus, the destination link set in this example includes the link data records 224 for road segments R1 (travels in both directions), R3 (travels in both directions), R4 (travels out of or from the tile T'), R5 (travels in both directions), and R6 (travels in both directions). Even though R2 extends to the border of tile T', R2 is not included in the destination link set because it has a travel direction that extends into the tile T'.

Once the starting link data set and destination link data set have been determined, the server application 308 determines or calculates an optimal route between each of the link data records 224 in the starting link data set and the link data records 224 in the destination link data set based on the given cost function (e.g., "shortest route) and any specified constraints (e.g., "avoid highways"). FIG. 6 illustrates the determined optimal routes, indicated by a thick black line, between the link data records in the starting link data set (which includes the link data records for road segments R1, R2, R3, R5, and R6) and the link data records in the destination link data set (which includes the link data records for road segments R1, R3, R4, R5, and R6). As shown in FIG. 6, the link data records for the road segments R7, R8, R9, R10, and R11 form or are part of the optimal routes. The link data records for these segments, as well as the link data records for the road segments R1-R6, are thus the link data records to be stored in the layer 258. The link data records for other road segments (i.e., the link data records that do not form or are not part of the optimal routes) are not stored in the layer 258.

Once the server application 308 makes this determination, the server application 308 is operative to store the one or more determined link data records in the respective layer 250, 254, 258, or 262 of the database 212. The one or more link data records may be stored in one or more tiles of the respective layer 250, 254, 258, or 262. In the example shown in FIGS. 4-6, the server application 308 is operative to store the link data records for road segments R1-R11 in the layer 258.

By compiling the layers of the database 212 as described herein, the one or more layers 250, 254, 258, 262 may only contain or include those link data records 224 that are necessary to traverse or travel from one border link or road segment of the respective layer to another border link or road segment of that respective layer. The database 212 is thus compiled or structured so that the navigation server 220 can determine or find the optimal route between the starting point S and the destination point D.

After one or more of the layers 250, 254, 258, 262 have been compiled, the server application 308 may, in some embodiments, determine one or more additional or inter-level link data records of the plurality of link data records 224 to be stored in one or more of the layers 250, 254, 258, 262. The inter-level link data records generally provide possible routes between border link data records and between layers. The inter-level link data records are different than the link data records that form part of one or more optimal routes and are already stored in that respective layer. The inter-level link data records may be determined for, and ultimately stored in, one layer 250, 254, 258, 262, all of the layers 250, 254, 258, 262, or any other combination of layers. In any event, these inter-level link data records may be added in an attempt to facilitate movement of the route calculation algorithm between different routing layers and, therefore, speed up the calculation of an optimal route between a starting point and a destination point, as will be described below.

The server application 308 generally determines the inter-level link data records to be stored in one or more of the layers 250, 254, 258, 262 based on the link data records stored in the one or more respective lower-level layers 254, 258, 262, 266. For each tile of the one or more lower-level layers 254, 258, 262, 266, the server application 308 detects outgoing link data records (link data records that cross a tile border of a tile of the one or more lower-level layers and have a travel direction that extends or travels out of or from the tile border) that are not boundary link data records for a tile of one or more respective higher-level layers 250, 254, 258, 262 (i.e., link data records that do not cross a tile border of a tile of the one or more higher-level layers). In turn, the server application 308 computes or determines a shortest route from each of these outgoing link data records to all outgoing link data records (i.e., link data records that extend or travel out of the tile border) for the tile of the one or more respective higher-level layers 250, 254, 258, 262 that are not part of or included in the lower-level tile (the tile of the one or more respective lower-level layers). The link data records on each of these shortest routes are added to, and stored in, the one or more respective higher-level layers 250, 254, 258, 262 as inter-level link data records.

In the embodiments in which the server application 308 determines and stores the inter-level link data records for one or more of the layers 250, 254, 258, 262, the server application 308 may assign an indicator (e.g., a flag) to each link data record in the one or more respective layers 250, 254, 258, 262 that indicates whether that link data record is an inter-level link data record or was added to the layer when the server application 308 is compiling the layer of the database 212, as described above.

Figure 7:
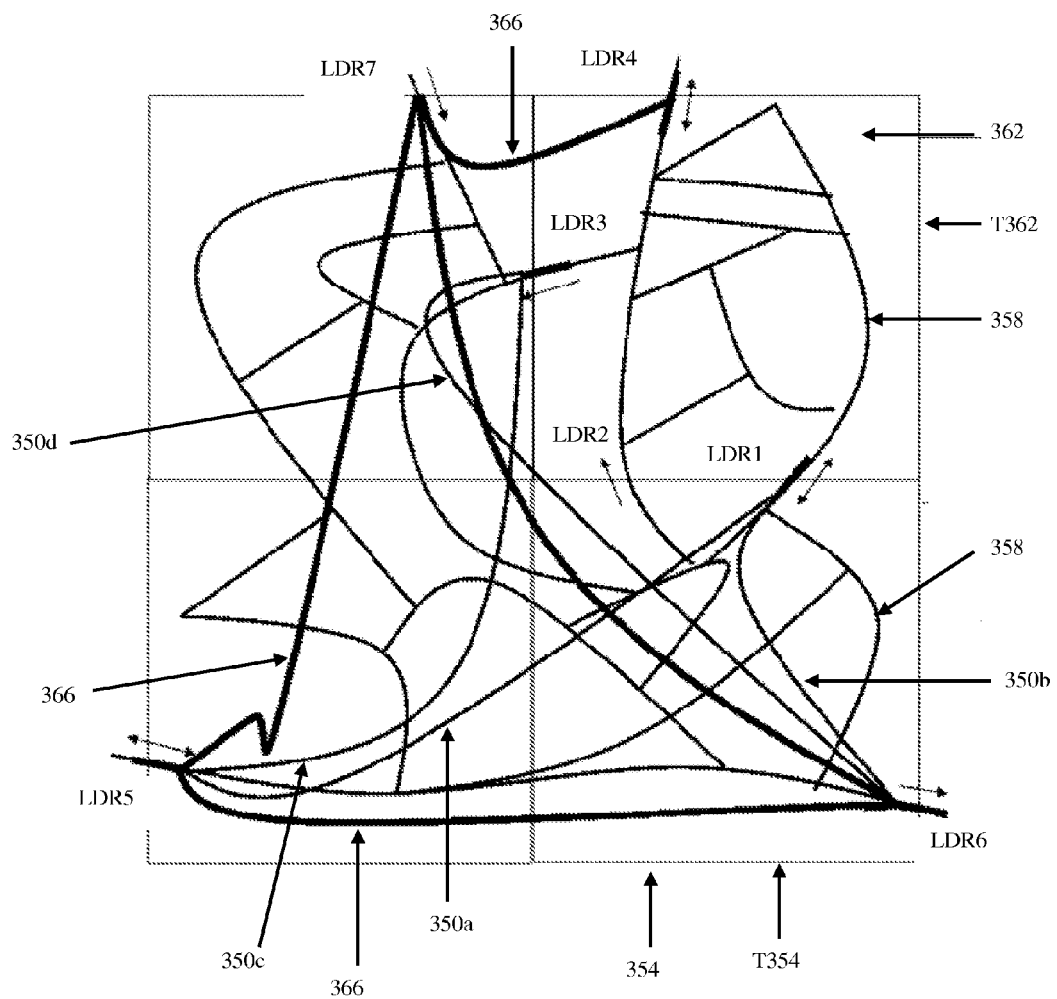
FIG. 7 depicts third and fourth exemplary layers of the navigation database of FIG. 3 and calculating inter-level link data records to be stored in the fourth layer from the link data records stored in the third layer.

FIG. 7 illustrates an example of how inter-level link data records 350 for a portion of a layer 354 (e.g., layer 250, 254, 258, 262) may be determined based on link data records 358 (e.g., link data records 224) stored in a lower-level layer 362 (e.g., layer 254, 258, 262, 266). The inter-level link data records 350 are different than the previously determined link data records 366 already stored in the layer 354.

The layer 354 is divided into a plurality of equally-sized and square-shaped tiles T354, and the layer 362 is divided into a plurality of equally-sized and square-shaped tiles T362. The tiles T354 are, in this example, four times larger than the tiles T362 (i.e., each tile T354 includes four tiles T362). The portion of the layer 354 depicted in FIG. 7 includes one tile T354, while the portion of the layer 362 depicted in FIG. 7 includes four tiles T362.

For each tile T362 of the layer 362, the server application 308 detects outgoing link data records (link data records that cross a tile border of the respective tile T362 of the layer 362 and have a travel direction that extends or travels out of or from the tile border) that are not boundary link data records for the tile T354 of the layer 354. Accordingly, for the upper right tile T362, the server application 308 detects link data records LDR1 and LDR3. Link data record LDR2, which has a travel direction that extends into the tile border (see the arrow in FIG. 7), is not an outgoing link data record because it does not have a travel direction that extends or travels out from the tile border. Link data record LDR4, which is a boundary link data record for the tile T354, is also not an outgoing link data record. In turn, the server application 308 determines a shortest route from each of the outgoing link data records LDR1 and LDR3 to all outgoing link data records for the tile T354 of the higher-level layer 354 that are not part of the lower-level tile T362. Accordingly, the server application 308 determines a shortest route from each of the outgoing link data records LDR1 and LDR3 to link data records LDR5 and LDR6. The server application 308 does not determine a shortest route from link data records LDR1, LDR3 to either link data record LDR4 or link data record LDR7, as link data record LDR4 is part of the upper right tile T362 and LDR7 is not an outgoing link data record for the tile T354 (see the arrow in FIG. 7). As shown in FIG. 7, the shortest route from LDR1 to LDR5 includes or consists of link data record 350a, the shortest route from LDR1 to LDR6 includes or consists of link data record 350b, the shortest route from LDR3 to LDR5 includes or consists of link data record 350c, and the shortest route from LDR3 to LDR6 includes or consists of link data record 350d. The link data records 350a, 350b, 350c, 350d are thus the inter-level link data records determined for the tile T354 based on the upper right tile T362. The inter-level link data records are, in turn, stored, along with the previously determined link data records 366 in the layer 354

Using this same process for the other tiles T362, the inter-level data records for the tile T354 may be determined and stored in the layer 354. Likewise, using this same process for the other tiles T362 not depicted in FIG. 7, the inter-level data records for all of the tiles T354 in the layer 354 may be determined and stored in the layer 354.

In some embodiments, the server application 308 may, using one or more routing algorithms, also calculate or determine one or more cost values (for one or more cost functions, respectively) for or of each optimal route between one of the link data records in the starting link data set and one of the link data records in the destination link data set (i.e., for each combination of starting link data records and destination link data records). Since the server application 308 may compile more than one of the layers 250, 254, 258, 262 as described above, the server application 308 may calculate one or more cost values (for one or more cost functions, respectively) for each optimal route between starting link data records and destination link data records in more than one of the layers 250, 254, 258, 262. When the link data record is both the starting link data record and the destination link data record, no optimal route is possible, and the cost is zero. For example, when the starting link data record is R1 and the destination link data record is also R1, no optimal route is possible, and the cost is zero. When two link data records are in both the starting link data set and the destination link data set, the cost for one combination of the two link data records (starting link=link data record #1; destination link=link data record #2) may, but need not, be the same as the cost for the other combination of the two link data records (starting link=link data record #2; destination link=link data record #1). In some embodiments, the server application 308 may also determine one or more cost values (for one or more cost functions, respectively) between link data records in the one or more pre-compiled layers 254, 258, 262, 266. In other embodiments, the one or more cost values between link data records in the one or more pre-compiled layers may be input into the navigation system 200 by the system operator or by the end user of the navigation system.

When two or more optimal routes are calculated using two or more different cost functions, the server application 308 may assign one or more cost function indicators (e.g., a vector of cost function flags) to each of the one or more determined link data records. Each cost function indicator indicates whether the respective link data record is on or part of an optimal route for a given cost function. For example, if one link data record is on an optimal route for cost function #1 and on an optimal route for cost function #2, the server application 308 may assign the cost function indicators (c1,c2) to that link data record.

In the embodiments in which the server application 308 determines one or more costs (for one or more cost functions, respectively) for or of each optimal route between one of the link data records in the starting link data set and one of the link data records in the destination link data set, the server application 308 is operative to store these cost values for each optimal route. In addition, the server application 308 is operative to store cost values for or of routes between link data records in the one or more pre-compiled layers (e.g., the layers 254, 258, 262, 266). The cost values may be stored in a cost matrix, cost table, cost chart, or in some other way, in each tile of the respective layer, or, more generally, in the respective layer.

Moreover, in the embodiments in which the server application 308 assigns cost function indicators to each of the link data records, the server application 308 is operative to store the assigned cost function indicators. All of the cost function indicators for each respective link data record may be stored in the same tile (of whichever layer that the link data record is to be stored in) or different cost function indicators may be stored in different tiles. For example, the cost function indicator (c1) may be stored in a different tile than the cost function indicator (c2).

In addition to compiling the database 212, the server application 308 (or another application included in the navigation server 220) is operative to obtain or access the geographic data, particularly the data records 224, 226, compiled in the navigation database 212. In turn, the server application 308 may provide or generate navigation-related functions, such as route calculation, for the end user associated with the navigation system 200. When, for example, the server application 308 is provided with a starting point, a destination point, and a cost function (e.g., "shortest route"), the server application 308 may, using a route calculation algorithm and the compiled database 212, calculate or generate an optimal route between the starting point and the destination point based on the cost function and provide that optimal route to the user of the navigation system 200.

The route calculation algorithm may be a Dijkstra algorithm, an A-star algorithm, a Douglas-Peucker algorithm, or any other type of algorithm (e.g., a bi-directional variant). To determine, provide, or generate the optimal route between the starting point and the destination point, the server application 308, via the route calculation algorithm, generally explores the link data records 224 stored in one or more routing layers (e.g., the layers 250, 254, 258, 262, 266) of the database 212. In this embodiment, the route calculation algorithm begins at the starting point, which is located in a tile of one of the layers (e.g., the layer 250, 254, 258, 262, 266). In other embodiments, the route calculation algorithm may begin at the destination point, which is also located in a tile of one of the layers (though not necessarily the same layer as the starting point), and works backwards).

The route calculation algorithm explores the tile in which the starting point is located until it discovers, identifies, or reaches a border link of the tile. The algorithm determines whether this link is a border link (i.e., a link that crosses a border) for a higher-level tile (i.e., a tile of one of the higher-layers). When the algorithm determines that this link is not a border link of the higher-level tile, the algorithm continues exploring the tile and/or other tiles of the same layer until another border link in the same layer is reached. When the algorithm determines that this link is a border link of the higher-level tile, the algorithm determines whether the higher-level tile includes the destination point. When the algorithm determines that the link is a border link of this higher-level tile and the higher-level tile does not include the destination point, the algorithm proceeds, steps up, or goes up to the next higher-level and uses the more thinned-out routing graph of that higher-level. The algorithm may continue to go up to higher levels (i.e., a level higher than the "next-higher level") so long as these higher levels do not include the destination point or until the highest level of the database 212 is reached. Thus, the algorithm may, in some cases, go up several layers at once. When, however, the algorithm determines that the link is a border link of this higher-level tile but the higher-level tile does include the destination point, the algorithm proceeds, steps down, or goes down to the next-lowest level and uses the more detailed or less thinned-out routing graph of that lower level. The algorithm may continue to go down to lower levels so long as these lower levels include the destination point or until the lowest level of the database 212 is reached. Thus, the algorithm may, in some cases, go down several layers at once. The above-described process continues until the algorithm reaches the destination point (or the starting point, if the algorithm starts at the destination point).

In the embodiments in which the server application 308 determines and stores inter-level link data records in one or more of the layers 250, 254, 258, 262, the route calculation algorithm may, while calculating the optimal route between the starting point and the destination point, utilize or exploit these inter-level link data records to expedite the calculation of this optimal route. Specifically, when the route calculation algorithm is exploring tiles of one of the layers, the route calculation algorithm may reach or find one of the inter-level link data records. Because the inter-level link data record is stored both in that layer and one of the higher-level layers, the route calculation algorithm may move up to that higher-level layer. In turn, at least some of the route calculation may be performed at or using that higher-level layer. Since the higher-level layer includes less link data records, the algorithm has to explore fewer link data records than it would otherwise have to explore at the original, lower-level, layer. As a result, this reduces the processing time needed by the algorithm to explore the one or more layers and expedites the calculation of the optimal route.

Alternatively, in the embodiments in which the server application 308 stores cost values (e.g., a cost matrix) for routes between link data records in one or more of the compiled layers 250, 254, 258, 262) and/or cost values for routes between link data records in one or more of the pre-compiled layers 254, 258, 262, 266, the route calculation algorithm may utilize or exploit these cost values to expedite the calculation of the optimal route between the starting point and the destination point. In general, the route calculation algorithm explores the routing network of layers for the start and destination points, but the algorithm utilizes the stored cost values for all intermediate link data records. Specifically, when the algorithm determines that a border link of a tile in a layer is not a border link of a higher-level tile (i.e., a tile in a higher-level layer), instead of continuing to explore the tile and/or other tiles of the same layer, the algorithm may retrieve the cost values, and using these cost values, find another border link in the layer. For example, the algorithm may find the border link in the layer associated with a cheap or low cost value. Similarly, when the algorithm determines that a link is a border link of a tile in a layer is a border link of a higher-level tile and the higher-level tile does not include the destination point, the algorithm may step up to the higher-level and use the cost values for that higher-level, rather than exploring the tiles of that higher-level, to find the next link. After all of the border links have been found or determined for the route between the starting point and the destination point, the algorithm may then calculate the specific, optimal route between the intermediate border links in the manner described above. The optimal route between the starting point and the destination point includes the optimal routes between the intermediate border links.

The route calculation algorithms disclosed herein produce an optimal route between the starting point and the destination point D. Unlike known route calculation algorithms, however, which typically explore all link data records on a lowest routing level until the optimal route is determined, the disclosed route calculation algorithm selectively explores link data records by actively moving up and/or down routing levels. As such, the route calculation algorithm need not explore as many link data records as known route calculation algorithms, and yet still produces the optimal route between the starting point and the destination point.

Figure 8:
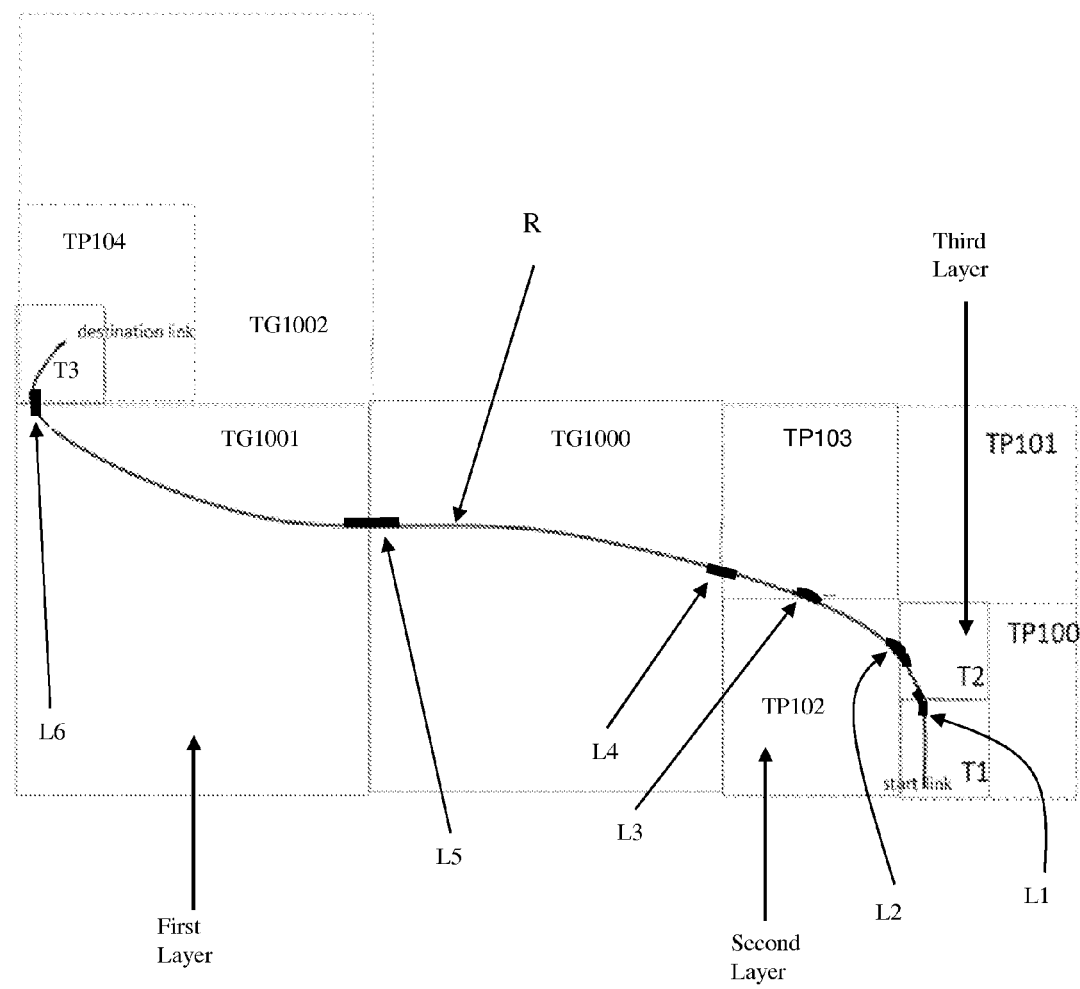
FIG. 8 depicts an exemplary route calculation algorithm using the navigation database of FIG. 3.

Turning now to FIG. 8, the calculation of an exemplary optimal route R by the server application 308, using a route calculation algorithm as described above, will now be described. FIG. 8 illustrates a portion of an exemplary first layer (e.g., the layer 250, 254, or 258), a portion of an exemplary second layer (e.g., the layer 254, 258, or 262), which is at a lower level than the first layer, and a portion of an exemplary third layer (e.g., the layer 258, 262, or 266), which is at a lower level than the first and second layers. As described above, each of the exemplary first, second, and third layers is divided into a plurality of equally-sized and square-shaped tiles. The portion of the first layer illustrated in FIG. 8 includes tiles TG1000, TG1001, and TG1002. Link data records L5 and L6 are stored in the first layer. The portion of the second layer illustrated in FIG. 8 includes tiles TP100, TP101, TP102, TP103, and TP104. The tiles TP100, TP101, TP102, TP103, and TP104 are smaller than the tiles TG1000, TG1001, and TG1002. Link data records L3 and L4 are stored in the second layer. The portion of the third layer illustrated in FIG. 8 includes tiles T1, T2, and T3. The tiles in the third layer—T1, T2, and T3—are smaller than the tiles in the first and second layers. The start and destination link data records, as well as link data records L1 and L2 are stored in the third layer.

The route calculation algorithm begins at the starting link data record, which is stored in the tile T1. The route calculation algorithm explores the link data records in the tile T1 until identifying the link data record L1, which is a border link data record of the tile T1 in the third layer. Accordingly, the route calculation algorithm determines whether the link data record L1 is a border link of the higher-level tile TP100, which is a tile of the second layer. Since L1 is not a border link of the higher-level tile TP100, the route calculation algorithm continues exploring the third layer, loading the tile T2, until the algorithm reaches the link data record L2. The route calculation algorithm determines whether the link data record L2 is a border link of the higher-level tile TP100. Since the link data record L2 is a border link of the higher-level tile TP100, the route calculation algorithm goes up one level, to the second layer or level, and loads tiles from this layer. Since the link data record L2 is not a border link of an even higher level tile (e.g., a tile of the first layer), a multi-level transition is not provided. The algorithm explores the tile TP102 until it arrives at the link data record L3. Since, however, the data link record L3 is not a border link of any of the higher-level tiles of the first layer (e.g., the tile TG1000), the algorithm stays on the same level, the second layer. The algorithm continues exploring the data link records of the second layer until it arrives at the link data record L4 in the tile TP103. Since the link data record L4 is a border link of the higher-level tile TG1000 (of the first layer), the algorithm goes up another level, to the first layer, and loads the neighboring tile, the tile TG1001, from the first layer. The algorithm explores the link data records of TG1000 until it arrives at the link data record L5. The algorithm uses this link data record to get to the tile TG1001. The algorithm explores the link data records of TG1001 until it arrives at the link data record L6. Since the destination link is included in the neighboring tile TG1002, the algorithm drops back down to the second layer. Because, however, the tile TP104 also includes the destination link, the algorithm drops down two levels to the third layer and continues the search using the tile T3 of the third layer. The algorithm searches the tile T3 until the destination link is identified in the third layer. With the algorithm finding the destination link in the tile T3, the route calculation algorithm has completed the calculation of the optimal route R.

Figure 9:
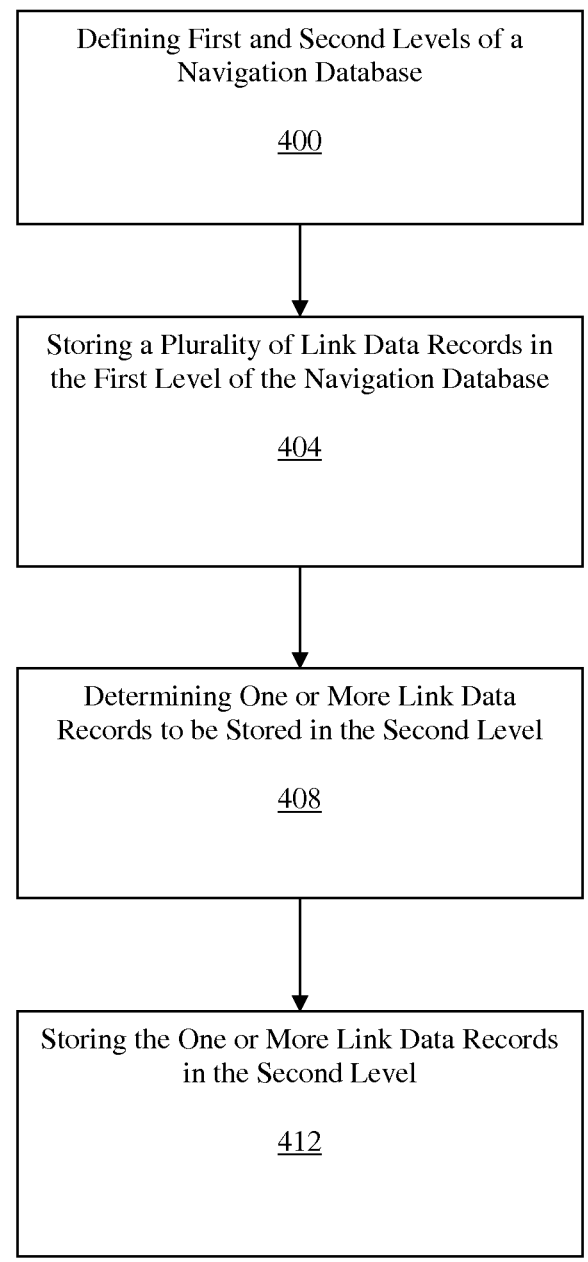
FIG. 9 depicts a flow chart showing one embodiment of a method for compiling a navigation database.

FIG. 9 shows a flow chart depicting a method for compiling a navigation database (e.g., the navigation database 212). The operation may be implemented using the navigation system 200, particularly the navigation server 220, described above. In other embodiments, a different system and/or server may be used. The method is implemented in the order shown, but may be implemented in or according to any number of different orders. Additional, different, or fewer acts may be provided. For example, any number of additional layers or levels (e.g., a third level, a fourth level, etc.) may be defined. In turn, the acts of determining one or more link data records to be stored in one or more of these additional layers and storing the one or more determined link data records in the respective layer may be performed for one, some, or all of these additional layers as well.

The navigation database may be defined or structured to include any number of different graphical layers or levels. The method or operation includes defining first and second levels of the navigation database (act 400). The first level includes or is divided into a plurality of first tiles, and the second level includes or is divided into a plurality of second tiles. The second level is "higher" than the first level, such that the second tiles are larger than the first tiles. As briefly mentioned above, the navigation database may be defined to include any number of additional levels, such as a third level, a fourth level, etc., each including a plurality of tiles. The usage of "first," and "second," as used herein in connection with the levels, is merely for reference and is not intended to be limiting. For example, the first level may be "higher" than the second level. As another example, the first level may, in some embodiments, be the fifth level.

The method or operation includes storing a plurality of link data records (e.g., the link data records 224) in the first level of the navigation database (act 404). The plurality of link data records are links or segments representative of roads, streets, or paths (e.g., the roads 104) in a geographic region (e.g., the geographic region 100). The plurality of link data records may be stored or pre-compiled in the first level based on the FRC value assigned to each of the link data records. For example, any link data records assigned an FRC value of 1, 2, or 3 may be stored in the first level. The plurality of link data records may, alternatively, be stored or pre-compiled in the first level based on a different value (e.g., different importance value) or according to some other criteria.

The method or operation also includes determining one or more link data records of the plurality of link data records stored in the first level to be stored in the second level (act 408). The determining is generally based on a position of each of the plurality of link data records (stored in the first level) relative to the plurality of second tiles of the second level. The determining may be based on a position of each of the plurality of link data records (stored in the first level) relative to tile borders of the plurality of second tiles in the second level. The determining may be based on one or more link data records of the plurality of link data records (stored in the first level) that cross or span one or more tile borders of the plurality of second tiles of the second level.

In one embodiment, the determining includes (i) determining a starting link set including at least one link data record of the plurality of link data records that crosses a tile border of one of the plurality of second tiles of the second level and has a travel direction that extends or travels into the tile border, (ii) determining a destination link set including at least one link data record of the plurality of link data records that crosses a tile border of one of the plurality of second tiles of the second level and has a travel direction that extends or travels out of or from the tile border, and (iii) calculating an optimal route, based on a cost function, between each of the at least one link data records in the starting link set and the at least one link data records in the destination link set, each optimal route including one or more link data records stored in the first level of the navigation database. The cost function may be "shortest route," "fastest route," "most economical route," or any other cost function.

The method or operation further includes storing the one or more determined link data records in the second level of the navigation database based on the determining. The storing may include storing the one or more link data records that are part of each optimal route in the second level of the navigation database.

The process may repeat for other layers. Each layer or level is compiled based on links with more spatial detail in an adjacent layer or level.

Figure 10:
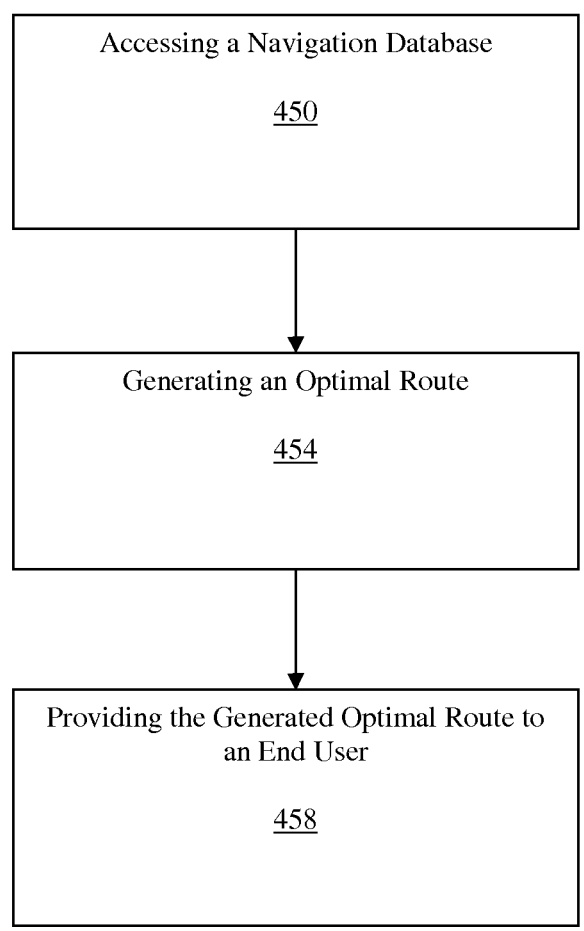
FIG. 10 depicts a flow chart showing one embodiment of a method for providing an optimal route based on a compiled navigation database.

FIG. 10 shows a flow chart depicting a method for providing an optimal route using a compiled database (e.g., the navigation database 212). The operation may be implemented using the navigation system 200, particularly the navigation server 220, described above. In other embodiments, a different system and/or server may be used. The method is implemented in the order shown, but may be implemented in or according to any number of different orders. Additional, different, or fewer acts may be provided. For example, any number of optimal routes may be generated for an end user and/or other end users.

The method or operation includes accessing a navigation database (e.g., the navigation database 200) (act 450). The navigation database is divided or organized into first and second levels. The first level is divided into a plurality of first tiles and has or includes a plurality of link data records (e.g., link data records 224) stored therein. The second level is higher than the first level and is divided into a plurality of second tiles. The second tiles are larger than the first tiles. One or more of the plurality of link data records stored in the first level are stored in the second level based on a position of each of the plurality of link data records relative to the plurality of second tiles.

The method or operation includes generating an optimal route between a starting point or link and a destination point or link using or based on the navigation database (act 454). The optimal route is generated using a route calculation algorithm (e.g., a Dijkstra algorithm). Generating the optimal route may include moving between the first and second levels at one or more tile borders of the first tiles, the second tiles, or a combination thereof. Moving between the first and second levels may include moving from the first level to the second level based on whether a link data record stored on the first level is a border link of a first tile of the plurality of first tiles, a border link of a second tile of the plurality of second tiles, and the second tile includes the destination link. Moving from the first level to the second level may include moving from the first level to the second level when the link data record stored on the first level is a border link of the first tile of the plurality of first tiles, a border link of the second tile of the plurality of second tiles, and the second tile does not include the destination link.

The method or operation further includes providing, displaying, or outputting the generated optimal route to an end user of the navigation system (e.g., an end user of the navigation system 200) (act 458). The generated optimal route may be displayed via a display of the navigation system, provided via a speaker of the navigation system, via a combination thereof, or in some other way. Other navigation-related information may also be provided with the generated optimal route.

Figure 11:
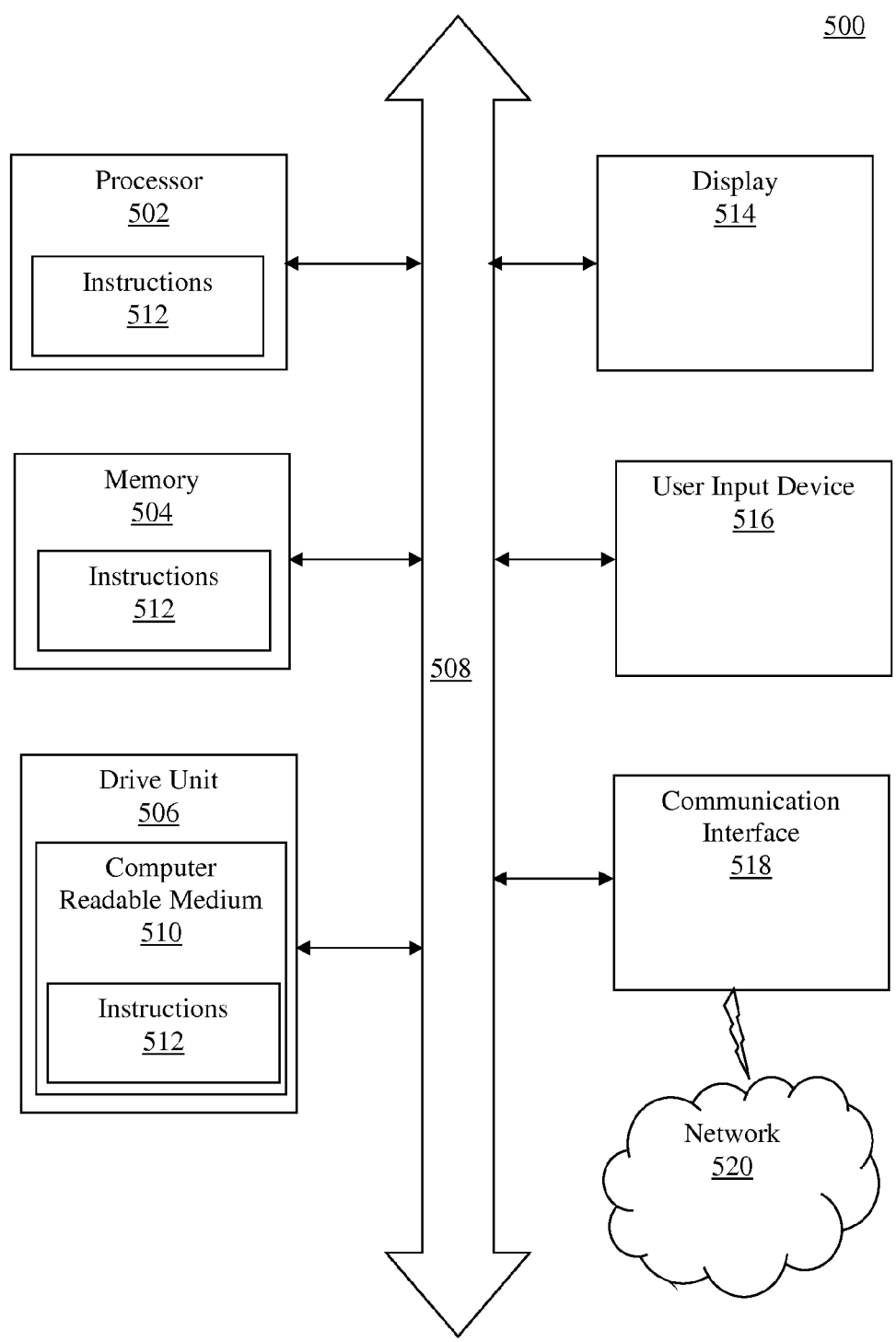
FIG. 11 depicts an exemplary computer system for use with the navigation system of FIG. 2.

FIG. 11 shows an illustrative embodiment of a general computer system 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. Any of the components discussed above may be a computer system 500 or a component in the computer system 500.

In a networked deployment, the computer system 500 may operate in the capacity of a server or as a client user computer in a client-server user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 11, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more general processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via a bus 508. The memory 504 may be a main memory, a static memory, or a dynamic memory. The memory 504 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 504 includes a cache or random access memory for the processor 502. In alternative embodiments, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the programmed processor 502 executing the instructions stored in the memory 504. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 500 may further include a display unit 514, such as a liquid crystal display (LCD), an organic light emitting diode (OLED), a flat panel display, a solid state display, a cathode ray tube (CRT), a projector, a printer or other now known or later developed display device for outputting determined information. The display 514 may act as an interface for the user to see the functioning of the processor 502, or specifically as an interface with the software stored in the memory 504 or in the drive unit 506.

Additionally, the computer system 500 may include an input device 516 configured to allow a user to interact with any of the components of system 500. The input device 516 may be a number pad, a keyboard, or a cursor control device, such as a mouse, or a joystick, touch screen display, remote control or any other device operative to interact with the system 500.

In a particular embodiment, as depicted in FIG. 11, the computer system 500 may also include a disk or optical drive unit 506. The disk drive unit 506 may include a computer-readable medium 510 in which one or more sets of instructions 512, e.g. software, can be embedded. Further, the instructions 512 may embody one or more of the methods or logic as described herein. In a particular embodiment, the instructions 512 may reside completely, or at least partially, within the memory 504 and/or within the processor 502 during execution by the computer system 500. The memory 504 and the processor 502 also may include computer-readable media as discussed above.

The present disclosure contemplates a computer-readable medium that includes instructions 512 or receives and executes instructions 512 responsive to a propagated signal, so that a device connected to a network 520 can communicate voice, video, audio, images or any other data over the network 520. Further, the instructions 512 may be transmitted or received over the network 520 via a communication port 518. The communication port 518 may be a part of the processor 502 or may be a separate component. The communication port 518 may be created in software or may be a physical connection in hardware. The communication port 518 is configured to connect with a network 520, external media, the display 514, or any other components in system 500, or combinations thereof. The connection with the network 520 may be a physical connection, such as a wired Ethernet connection or may be established wirelessly as discussed below. Likewise, the additional connections with other components of the system 500 may be physical connections or may be established wirelessly.

The network 520 may include wired networks, wireless networks, or combinations thereof, and may be representative of the networks 162 and/or 164. The wireless network may be a cellular telephone network, an 802.11, 802.16, 802.20, or WiMax network. Further, the network 520 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
    defining a plurality of levels of a hierarchical navigation database, wherein at least one level is divided into a plurality of tiles, wherein a geographic area of individual tiles of the level increases with higher levels of the hierarchical navigation database;
    storing a plurality of link data records in the plurality of levels of the hierarchical navigation database, the plurality of link data records representative of a plurality of road segments in a geographic region;
    identifying a lower level tile of a lower level of the hierarchical navigation database containing a starting point data record of a route, the route comprising link data records spanning a starting point data record and a destination point data record;
    identifying a link data record crossing a tile border of the lower level tile of the lower level of the hierarchical navigation database containing the starting point data record;
    determining whether the identified link data record also crosses a tile border of a higher level tile of a higher level of the hierarchical navigation database;
    determining whether the higher level tile includes the destination point data record of the route if the link data record is determined to be a border link data record of the higher level tile;
    determining a next link data record in the route from the higher level unless the higher level tile of the next link data record is determined to include the destination point data record;
    calculating, at a server, an optimal route from the starting point data record to the destination point data record based on identified link data records between the starting point data record and the destination point data record; and
    outputting the optimal route from the server to a different device.

2. The method of claim 1, further comprising:
    searching for a border link data record in a next tile of the plurality of lower level tiles of the lower level if the identified border link data record is not a border link data record of the higher level tile.

3. The method of claim 1, further comprising:
    searching for a border link data record in a next tile of the plurality of lower level tiles of the lower level if no border link data record is found in the lower level tile.

4. The method of claim 1, further comprising:
    identifying an inter-level link data record, wherein the inter-level link data record is stored in different levels of the hierarchical navigation database; and
    determining the next link data record in the route from the higher level layer associated with inter-level link data record.

5. The method of claim 1, further comprising:
    selecting a border link data record of the lower level tile based on a cost value if the identified border link data record is not a border link data record of the higher level tile.

6. The method of claim 5, wherein the cost value is based on a cost function comprising a shortest route, a fastest route, or a most economical route.

7. The method of claim 1, further comprising:
    determining a next link data record in the route from the higher level tile if the identified border link is a border link data record of the higher level tile that does not include the destination point; and
    selecting a next border link data record of the higher level tile based on a cost value.

8. The method of claim 1, further comprising:
    if the border link data record is determined to be a border link data record of the higher level tile, wherein the higher level tile includes the destination point data record, determining a next border link data record from a respectively lower level tile.

9. The method of claim 1, further comprising:
    selecting a next border link data record from a respectively higher level tile until the respectively higher level tile includes the destination point data record.

10. The method of claim 1, further comprising:
    selecting a next border link data record from a respectively higher level tile until the respectively higher level tile is of a highest level of the hierarchical navigation database.

11. An apparatus comprising:
    a hierarchical navigation database including a plurality of levels, wherein at least one level is divided into a plurality of tiles, wherein a geographic area of individual tiles of the level increases with higher levels of the hierarchical navigation database; and
    at least one processor; and
    at least one memory including computer program code for one or more programs; the at least one memory and the computer program code configured to, with the at least one processor, cause the apparatus to at least perform:
        determine a plurality of link data records to be stored in the plurality of levels of the hierarchical navigation database, the plurality of link data records representative of a plurality of road segments in a geographic region;
        identify a lower level tile of a lower level of the hierarchical navigation database containing a starting point data record of a route, the route comprising link data records spanning a starting point data record and a destination point data record;

identify a link data record crossing a tile border of the lower level tile of the lower level of the hierarchical navigation database containing the starting point data record;

determine whether the identified link data record also crosses a tile border of a higher level tile of a higher level of the hierarchical navigation database;

determine whether the higher level tile includes the destination point data record of the route if the link data record is determined to be a border link data record of the higher level tile;

determine a next link data record in the route from the higher level unless the higher level tile of the next link data record is determined to include the destination point data record;

search for a border link data record in a next tile of the plurality of lower level tiles of the lower level if the identified border link data record is not a border link data record of the higher level tile;

calculate an optimal route from the starting point data record to the destination point data record based on identified link data records between the startinuoint data record and the destination point data record; and output the optimal route from the apparatus to a different device.

12. The apparatus of claim 11, the at least one memory and the computer program code configured to, with the at least one processor, cause the apparatus to at least perform:

search for a border link data record in a next tile of the plurality of lower level tiles of the lower level if no border link data record is found in the lower level tile.

13. The apparatus of claim 11, the at least one memory and the computer program code configured to, with the at least one processor, cause the apparatus to at least perform:

identify an inter-level link data record, wherein the inter-level link data record is stored in different levels of the hierarchical navigation database; and determine the next link data record in the route from the higher level layer associated with inter-level link data record.

14. The apparatus of claim 11, the at least one memory and the computer program code configured to, with the at least one processor, cause the apparatus to at least perform:

select a border link data record of the lower level tile based on a cost value if the identified border link data record is not a border link data record of the higher level tile.

15. The apparatus of claim 14, wherein the cost value is based on a cost function comprising a shortest route, a fastest route, or a most economical route.

16. The apparatus of claim 15, the at least one memory and the computer program code configured to, with the at least one processor, cause the apparatus to at least perform:

determine a next link data record in the route from the higher level tile if the identified border link is a border link data record of the higher level tile that does not include the destination point; and select a next border link data record of the higher level tile based on a cost value.

17. The apparatus of claim 11, the at least one memory and the computer program code configured to, with the at least one processor, cause the apparatus to at least perform:

if the border link data record is determined to be a border link data record of the higher level tile, wherein the higher level tile includes the destination point data record, determining a next border link data record from a respectively lower level tile.

18. A non-transitory computer readable medium including instructions that, when executed are operable to:

access a hierarchical navigation database;

define a plurality of levels of the hierarchical navigation database, wherein at least one level is divided into a plurality of tiles;

store a plurality of link data records in the plurality of levels of the hierarchical navigation database, the plurality of link data records representative of a plurality of segments;

identify a tile of the hierarchical navigation database containing a starting point data record of a route, the route comprising link data records;

identify a link data record crossing a tile border of the tile of the hierarchical navigation database containing the starting point data record;

determine whether the identified link data record also crosses a tile border of a higher level tile of a higher level of the hierarchical navigation database than the tile containing the starting point data record;

determine a next link data record in the route from the higher level;

calculate, at a server, an optimal route from the starting point data record to the destination point data record based on identified link data records between the starting point data record and the destination point data record; and output the optimal route from the server to a different device.

* * * * *